United States Patent
Asakura et al.

(10) Patent No.: US 9,377,092 B2
(45) Date of Patent: Jun. 28, 2016

(54) BALL SCREW DEFLECTOR

(71) Applicant: JTEKT CORPORATION, Osaka-shi, Osaka (JP)

(72) Inventors: Toshihiro Asakura, Chiryu (JP); Tetsuya Kaneko, Okazaki (JP); Satoshi Fujita, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 14 days.

(21) Appl. No.: 14/222,054

(22) Filed: Mar. 21, 2014

(65) Prior Publication Data

US 2014/0290410 A1    Oct. 2, 2014

(30) Foreign Application Priority Data

Mar. 29, 2013  (JP) .................................. 2013-073716
Dec. 24, 2013  (JP) .................................. 2013-265381

(51) Int. Cl.
*F16H 1/24*      (2006.01)
*F16H 25/22*     (2006.01)
*B62D 5/04*      (2006.01)

(52) U.S. Cl.
CPC .......... *F16H 25/2219* (2013.01); *B62D 5/0448* (2013.01); *F16H 25/2214* (2013.01); *Y10T 74/19772* (2015.01)

(58) Field of Classification Search
CPC .. F16H 25/2219; F16H 25/22; F16H 25/2223
USPC ............................. 74/424.82, 424.86, 424, 87
See application file for complete search history.

(56) References Cited

U.S. PATENT DOCUMENTS

| | | | |
|---|---|---|---|
| 4,953,419 A | | 9/1990 | Schlenker |
| 6,851,722 B2 * | | 2/2005 | Chiu et al. ................. 285/134.1 |
| 8,534,152 B2 * | | 9/2013 | Hsu et al. .................... 74/424.87 |
| 8,544,356 B2 * | | 10/2013 | Asakura et al. ............. 74/424.82 |
| 2003/0123951 A1 * | | 7/2003 | Michioka et al. ............. 411/378 |
| 2008/0134822 A1 * | | 6/2008 | Pan et al. .................... 74/424.87 |
| 2009/0151493 A1 * | | 6/2009 | Miyahara ................... 74/424.87 |

(Continued)

FOREIGN PATENT DOCUMENTS

EP       1 318 332 A2    6/2003
JP       A-2007-147028   6/2007

(Continued)

OTHER PUBLICATIONS

Extended European Search Report issued in European Application No. 14161442.0 issued Jun. 26, 2014.

(Continued)

*Primary Examiner* — William Kelleher
*Assistant Examiner* — Zakaria Elahmadi
(74) *Attorney, Agent, or Firm* — Oliff PLC

(57) ABSTRACT

In an electric power steering system, there is provided a ball screw deflector configured to make it possible to easily measure the whole length of each of deflector pieces. A mating face of each of the deflector pieces and end faces of the deflector pieces are parallel to each other, and have an angle corresponding to a lead angle of a ball screw portion. Thus, it is possible to reduce the amount of material required to form each of the deflector piece pieces. In addition, it is possible to easily measure the overall length of each of the deflector pieces with the use of measuring equipment such as a vernier caliper.

12 Claims, 6 Drawing Sheets

AXIAL DIRECTION OF RACK SHAFT

(56) References Cited

U.S. PATENT DOCUMENTS

| | | |
|---|---|---|
| 2010/0043583 A1 | 2/2010 | Fukano et al. |
| 2011/0296939 A1* | 12/2011 | Kaneko et al. ............ 74/424.87 |
| 2012/0160048 A1* | 6/2012 | Chen et al. ................ 74/424.87 |
| 2013/0055839 A1* | 3/2013 | Pan et al. .................. 74/424.87 |
| 2013/0145670 A1 | 6/2013 | Kuhlman |
| 2013/0283953 A1* | 10/2013 | Iwasaki .................... 74/424.87 |

FOREIGN PATENT DOCUMENTS

| | | |
|---|---|---|
| JP | A-2010-48324 | 3/2010 |
| JP | U-3165152 | 1/2011 |

OTHER PUBLICATIONS

Nov. 23, 2015 Office Action issued in European Application No. 14 161 442.0.

\* cited by examiner

BALL SCREW DEFLECTOR

INCORPORATION BY REFERENCE

The disclosure of Japanese Patent Application No. 2013-073716 filed on Mar. 29, 2013 and No. 2013-265381 filed on Dec. 24, 2013 each including the specification, drawings and abstract, are incorporated herein by reference in its entirety.

BACKGROUND OF THE INVENTION

1. Field of the Invention

The invention relates to a ball screw deflector.

2. Description of the Related Art

Conventionally, there has been known an electric power steering system (hereinafter, referred to as "EPS") that assists a driver in performing a steering operation by applying driving power generated by a motor to a steering mechanism of a vehicle. In an EPS, a rack-and-pinion mechanism is usually adopted. The rack-and-pinion mechanism converts the rotational motion of a pinion caused by the operation of a steering wheel into a linear motion of a linear-motion shaft having a rack that is engaged with the pinion. The orientation of wheels is changed by the linear motion of the linear-motion shaft. In a rack assist-type EPS, a linear motion shaft is provided with a ball screw mechanism that converts the rotational motion of a motor into a linear motion of the linear-motion shaft.

The ball screw mechanism is formed by screwing a ball nut to a ball screw portion formed on the outer periphery of the linear-motion shaft with a plurality of balls interposed therebetween. In the EPS, the ball nut rotates, and therefore the ball nut is preferably compact in size in the radial direction in view of rotational balance, for example. Thus, the structure in which the ball nut is provided with a deflector (circulation member) that causes the balls in the ball screw portion to roll and circulate is widely adopted.

Japanese Utility Model Registration No. 3165152 describes a deflector for a common ball screw mechanism. The deflector is formed so as to be elongated in the axial direction of a linear-motion shaft. Thus, the structure in which the deflector is formed of a plurality of separate pieces is proposed in order to insure accuracy.

For example, as illustrated in FIG. 9, at the left end (in FIG. 9) of a deflector piece 100, there is formed a left end face 101 of the deflector piece 100 having an angle corresponding to a lead angle of a ball screw portion. Thus, it is possible to form the deflector piece 100 from a material that is reduced in amount by an amount corresponding to a hatched region 110. A circulation path 105 through which balls located at the ball screw portion are circulated is formed in the deflector piece 100.

The deflector piece 100 is connected to another deflector piece 120 at a mating face 115. The mating face 115 extends in a direction orthogonal to the axial direction of a linear-motion shaft (in the up-down direction in FIG. 9).

However, in this structure, the left end face 101 and the mating face 115 are not parallel to each other. Therefore, it is difficult to measure the overall length of the deflector piece 100 with the use of a vernier caliper, for example. That is, when the deflector piece 100 is held by two gauge heads of the vernier caliper, the positions of the gauge heads are not fixed. This causes variations in measured values, which reduces the reliability of the measured values. Although three-dimensional measurement may be adopted, the three-dimensional measurement is not preferable in terms of measurement time.

SUMMARY OF THE INVENTION

One object of the invention is to provide a ball screw deflector configured to make it possible to easily measure the whole length of each deflector piece.

In a ball screw deflector according to an aspect of the invention, the deflector comprises:
a plurality of deflector pieces. And the deflector circulates balls that roll between a ball screw portion formed on an outer periphery of a linear-motion shaft and a ball screw nut disposed around the ball screw portion; the deflector is disposed at an outer peripheral face side of the ball screw nut; the deflector is formed by assembling together the deflector pieces having shapes obtained by splitting the deflector at intermediate positions of the deflector in an axial direction of the linear-motion shaft; and a mating face of each of the deflector pieces and an end face of each of the deflector pieces, the end face being located on an opposite side of the deflector piece from the mating face, are parallel to each other and have an angle corresponding to a lead angle of the ball screw portion.

In the above aspect, the mating face of each of the deflector pieces and the end face of each of the deflector pieces, the end face being located on the opposite side of the deflector piece from the mating face, are parallel to each other and have an angle corresponding to a lead angle of the ball screw portion. Thus, it is possible to reduce the amount of material required to form each of the deflector piece as described in Description of the Related Art. In addition, it is possible to easily measure the overall length of each of the deflector pieces with the use of measuring equipment such as a vernier caliper.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
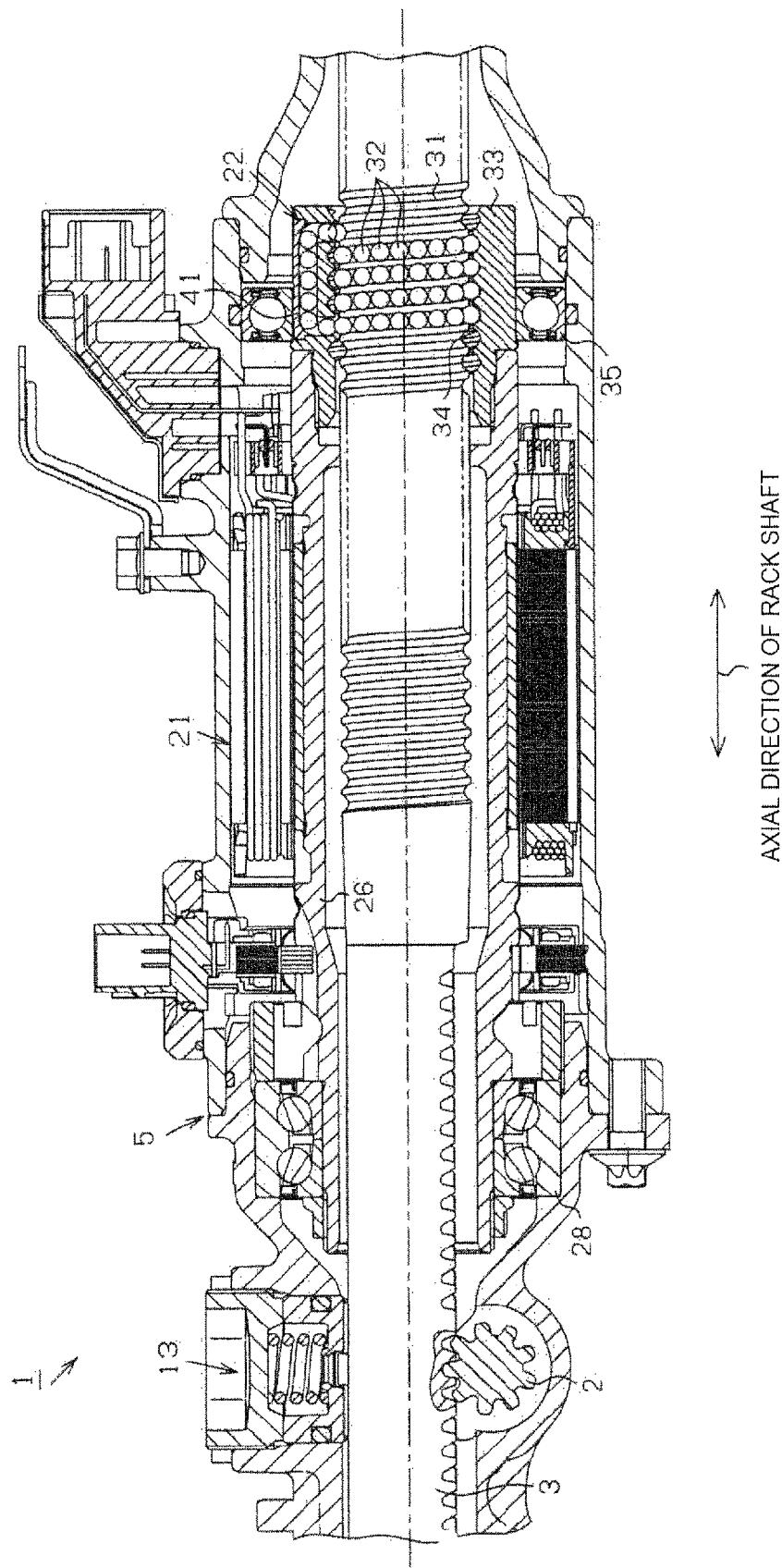
FIG. 1 is a sectional view of an electric power steering system according to a first embodiment of the invention.

Hereinafter, a first embodiment of the invention will be described with reference to FIG. 1 to FIG. 6. As illustrated in FIG. 1, an electric power steering system (EPS) 1 includes a pinion shaft 2 having a pinion, a linear-motion shaft 3 having a rack that is engaged with the pinion, and a rack housing 5 that accommodates the pinion shaft 2 and the linear-motion shaft 3.

The pinion shaft 2 engaged with the linear-motion shaft 3 is rotated in response to the operation of a steering wheel. The linear-motion shaft 3 is supported by a rack guide 13 and a bushing (plain bearing) (not illustrated) disposed in the rack housing 5 so as to be allowed to reciprocate along the axial direction. The linear-motion shaft 3 reciprocates in its axial direction (lateral direction in FIG. 1) in response to the rotation of the pinion shaft 2. The steered angle of steered wheels (not illustrated) is changed in accordance with the movement of the linear-motion shaft 3.

The EPS 1 includes a motor 21 that is a driving source for the EPS 1 and a ball screw device 22 that converts the rotational motion of the motor 21 into an axial motion of the linear-motion shaft 3. That is, the EPS 1 in the present embodiment is configured as a so-called rack assist-type EPS.

The motor 21 includes a motor shaft 26 formed in a cylindrical shape, and linear-motion shaft 3 is passed through the motor shaft 26. That is, the motor shaft 26 and the linear-motion shaft 3 are disposed coaxially. The motor shaft 26 is rotatably supported at its distal end-side outer peripheral face by a first bearing 28 disposed on the inner peripheral face of the rack housing 5. The motor shaft 26 rotates as the motor 21 is driven.

Figure 2:
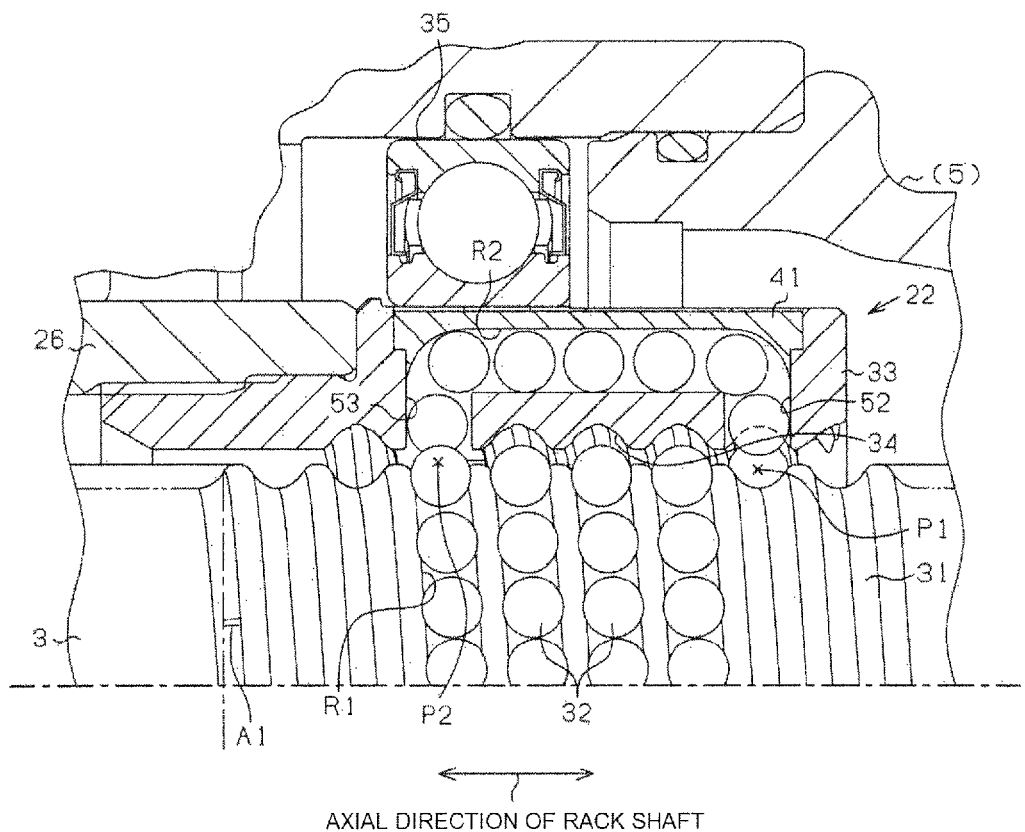
FIG. 2 is an enlarged view of part of the electric power steering system in the first embodiment shown in FIG. 1.

As illustrated in FIG. 2, the ball screw device 22 is a so-called deflector-type ball screw device, and includes a ball screw portion 31, a plurality of balls 32, and a ball screw nut 33. The ball screw portion 31 is formed by forming threads with a lead angle A1 in part of the outer periphery of the linear-motion shaft 3. The ball screw nut 33 is formed in a generally cylindrical shape, and thread groove 34 corresponding to the ball screw portion 31 of the linear-motion shaft 3 is formed in the inner periphery of the ball screw nut 33.

A left end portion of the ball screw nut 33 is press-fitted in a right end portion of the motor shaft 26. Thus, the motor shaft 26 is rotatable together with the ball screw nut 33. The ball screw nut 33 is screwed to the ball screw portion 31 with the balls 32 interposed therebetween. The ball screw nut 33 is rotatably supported by a second bearing 35 disposed on the inner peripheral face of the rack housing 5. A rolling path R1 is formed, as a spiral space, between the ball screw portion 31 and the thread groove 34 of the ball screw nut 33. The balls 32 are rollably disposed in the rolling path R1.

The rolling path R1 is connected to a circulation path R2 formed in the deflector 41, at connecting points P1, P2 set at two respective points in the thread groove 34. The circulation path R2 has the function of picking up the balls 32 from the rolling path R1 to the ball screw nut 33 and the function of discharging the balls 32 to the rolling path R1.

As illustrated in FIG. 2, when the deflector 41 is fitted to the ball screw nut 33, the outer peripheral face of the deflector 41 and the outer peripheral face of the ball screw nut 33 are flush with each other. Thus, the ball screw nut 33 to which the deflector 41 is fitted is rotatably supported by the second bearing 35. The deflector 41 is formed by metal injection molding (MIM). MIM is a molding method in which a mixture of metal powder and a binder is injected into a molding die.

Figure 3:
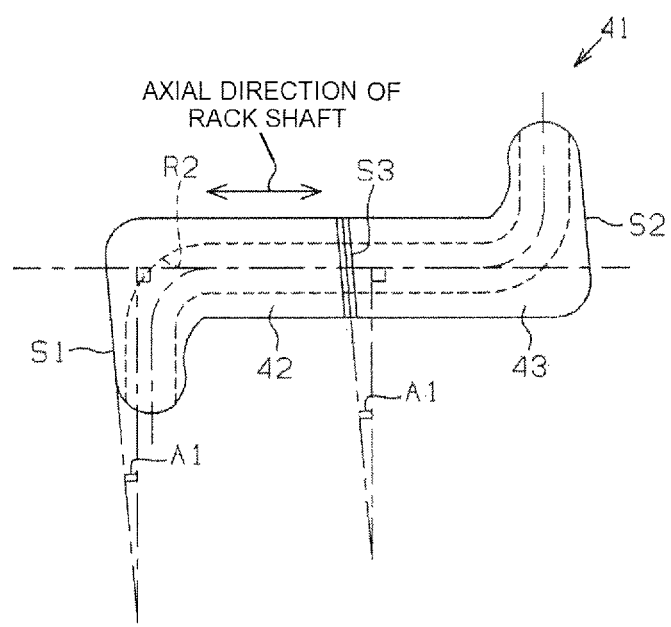
FIG. 3 is a plan view of a deflector in the first embodiment.

As illustrated in FIG. 3, the deflector 41 is formed in a generally Z-shape as viewed from above, and formed of two separate pieces having shapes obtained by splitting the deflector 41 at substantially the center in the axial direction of the linear-motion shaft 3. That is, the deflector 41 is faulted of a first deflector piece 42 and a second deflector piece 43. The deflector pieces 42, 43 are formed in the same shape. Mating faces S3 at which the deflector pieces 42, 43 are connected to each other are formed so as to extend in the direction along the lead angle A1.

In the deflector 41, there is the circulation path R2 formed in a generally Z-shape along the outer shape of the deflector 41 as viewed from above. The balls 32 are picked up from and discharged to the rolling path R1 through the circulation path R2. As illustrated in FIG. 2, the circulation path R2 is formed in a U-shape that opens in a downward direction in FIG. 2.

Figure 4:
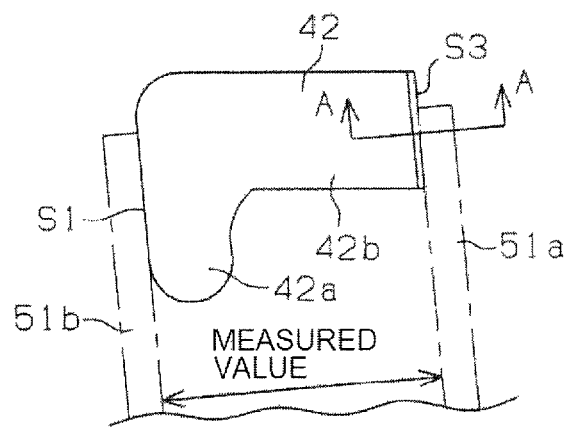
FIG. 4 is a plan view of a deflector piece in the first embodiment.
Figure 5:
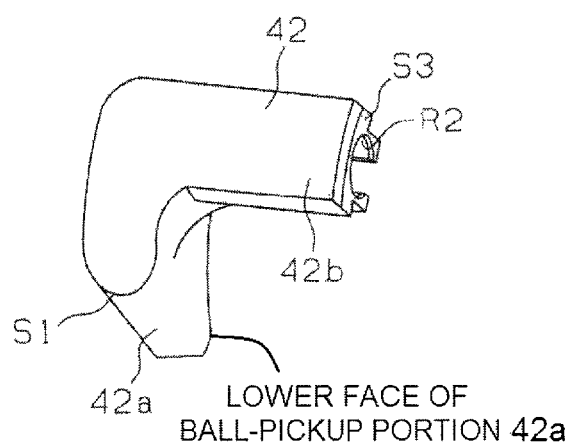
FIG. 5 is a perspective view of the deflector piece in the first embodiment.

As illustrated in FIG. 4 and FIG. 5, the first deflector piece 42 has a ball-pickup portion 42a and a ball-transfer portion 42b. The ball-transfer portion 42b extends in the axial direction of the linear-motion shaft 3. The ball-pickup portion 42a is generally orthogonal to the ball-transfer portion 42b. The lower face of the ball-pickup portion 42a is formed in a shape that conforms to the outer peripheral face of the linear-motion shaft 3. An end portion of the circulation path R2 is opened at the lower face of the ball-pickup portion 42a. The second deflector piece 43 as well as the first deflector piece 42 has a ball-pickup portion and a ball-transfer portion.

As illustrated in FIG. 3, the mating faces S3 of the deflector pieces 42, 43 are parallel to end faces S1, S2 that are on the opposite sides of the deflector pieces 42, 43 from the mating faces S3. The end faces S1, S2 are formed in a planar shape. Therefore, as indicated by alternate long and short dash lines in FIG. 4, the overall length of the first deflector piece 42 is easily measured with the use of two gauge heads 51a, 51b of a vernier caliper.

Figure 6:
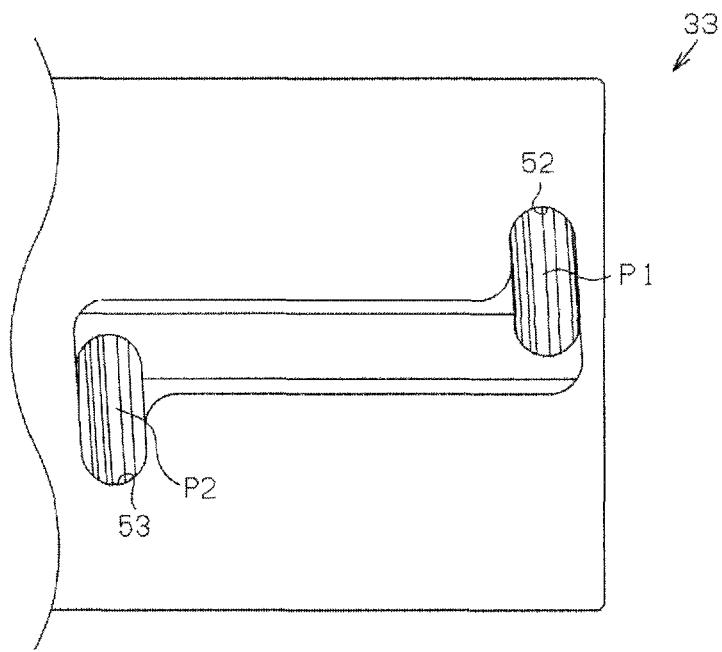
FIG. 6 is a plan view of a ball screw nut in the first embodiment.

As illustrated in FIG. 6, a pair of fitting holes 52, 53 is formed in the ball screw nut 33 so as to pass through the ball screw nut 33 in the radial direction. The fitting holes 52, 53 are formed in the ball screw nut 33, at positions corresponding to the two connecting points P1, P2, respectively. Each of the fitting holes 52, 53 is formed in a generally elliptical shape that is elongate in the up-down direction in FIG. 6. A lower end portion of the ball-pickup portion 42a of the first deflector piece 42 is fitted in the fitting hole 52. A lower end portion of the ball-pickup portion of the second deflector piece 43 is fitted in the fitting hole 53. When the lower end portions of the ball-pickup portions of the deflector pieces 42, 43 are fitted in the fitting holes 52, 53, the outer peripheral face of the deflector 41 and the outer peripheral face of the ball screw nut 33 are flush with each other as described above.

In MIM described above, it is necessary to form a layer of grease such as wax between the molding die and the heated and molten metal. This makes it difficult to control the shape accuracy. Thus, it is necessary to measure the overall length of each of the deflector pieces 42, 43.

The operation of the ball screw device 22 will be described below. As illustrated in FIG. 2, in the ball screw device 22, when the ball screw nut 33 rotates relative to the linear-motion shaft 3 in response to the rotation of the motor shaft 26, each ball 32 receives a load (frictional force) from the linear-motion shaft 3 and the ball screw nut 33 to roll in the rolling path R1. Thus, thrust force is transferred from the ball screw nut 33 to the linear-motion shaft 3, and the linear-motion shaft 3 moves in the axial direction with respect to the ball screw nut 33. Each ball 32 that has rolled through the rolling path R1 and reached one end (the connecting point P1 or the connecting point P2) of the rolling path R1 passes through the circulation path R2 formed in the ball screw nut 33 and is then discharged to the other end (the connecting point P2 or the connecting point P1) of the rolling path R1. In this way, the ball 32 moves from the downstream side to the upstream side between the two connecting points P1, P2 set in the rolling path R1. That is, as the balls 32 rolling in the rolling path R1 are infinitely circulated through the circulation path R2, the ball screw device 22 converts the rotational motion of the ball screw nut 33 into an axial motion of the linear-motion shaft 3.

According to the embodiment described above, the invention produces the following effects.

Figure 9:
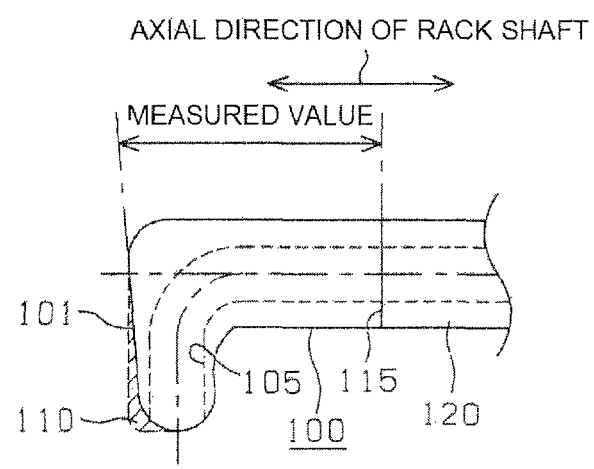
FIG. 9 is a plan view of a deflector piece in related art.

1) The end faces S1, S2 of the deflector pieces 42, 43 and the mating faces S3, at which the deflector pieces 42, 43 are connected to each other, are parallel to each other, and formed to have an angle corresponding to the lead angle A1 of the ball screw portion 31. Thus, it is possible to reduce the amount of material required to form in each of the deflector piece pieces 42, 43 by an amount corresponding to the hatched region 110 in FIG. 9. In addition, it is possible to easily measure the overall length of each of the deflector pieces 42, 43 with the use of measuring equipment such as a vernier caliper.

2) The end faces S1, S2 of the deflector pieces 42, 43 are formed in a planar shape. Thus, it is possible to accurately measure the overall length of each of the deflector pieces 42, 43 with the use of the two gauge heads 51a, 51b of the vernier caliper.

3) In the structure described in the related art, the deflector piece protrudes from the ball screw nut in the radial direction. This exerts an unfavorable influence on the arrangements and shapes of components (pulley) of a driving force transmission system and a bearing. In contrast, in the present embodiment, the outer peripheral face of the deflector 41 and the outer peripheral face of the ball screw nut 33 are flush with each other when the deflector 41 is fitted to the ball screw nut 33. Therefore, it is possible to dispose the second bearing 35 on the outer periphery of the ball screw nut 33. This increases the flexibility in design of the EPS 1.

Next, a second embodiment of the invention will be described with reference to FIG. 7, FIG. 8A, and FIG. 8B. The deflector pieces in the present embodiment differ from those in the first embodiment in that corners of the deflector pieces are chamfered. The difference from the first embodiment will be mainly described below.

Figure 7:
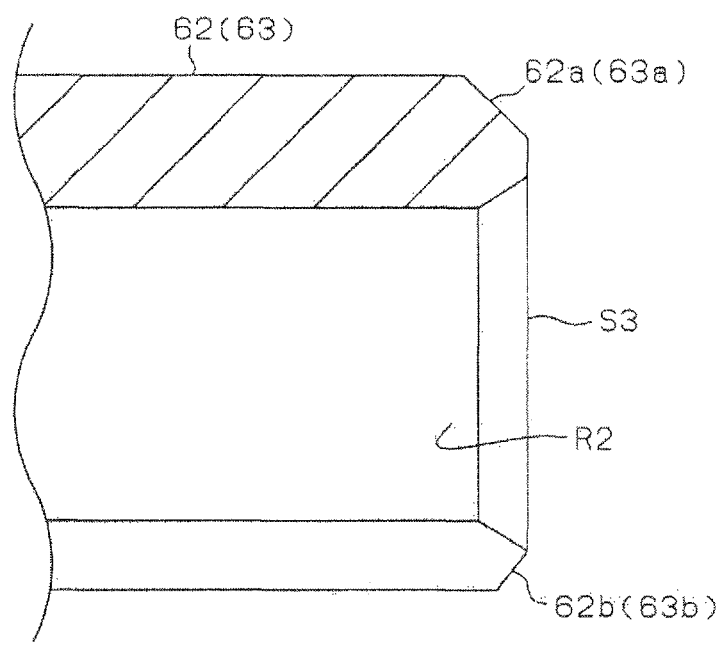
FIG. 7 is a sectional view of a deflector piece in a second embodiment of the invention, FIG. 7 corresponding to a sectional view taken along the line A-A in FIG. 4.

FIG. 7 is a sectional view of a deflector in the second embodiment, FIG. 7 corresponding to a sectional view taken along the line A-A in FIG. 4. As illustrated in FIG. 7, upper and lower corners of the mating face S3 of a first deflector piece 62 are chamfered, so that inclined faces 62a, 62b are formed. The upper inclined face 62a is formed so as to connect the mating face S3 to an upper face of the deflector piece 62. The lower inclined face 62b is formed so as to connect the mating face S3 to a lower face of the deflector piece 62.

Similarly, inclined faces 63a, 63b are formed at upper and lower corners of the mating face S3 of the second deflector piece 63. Next, the operation of the inclined faces of the deflector pieces 62, 63 during assembly of the deflector pieces 62, 63 will be described.

Figure 8A:
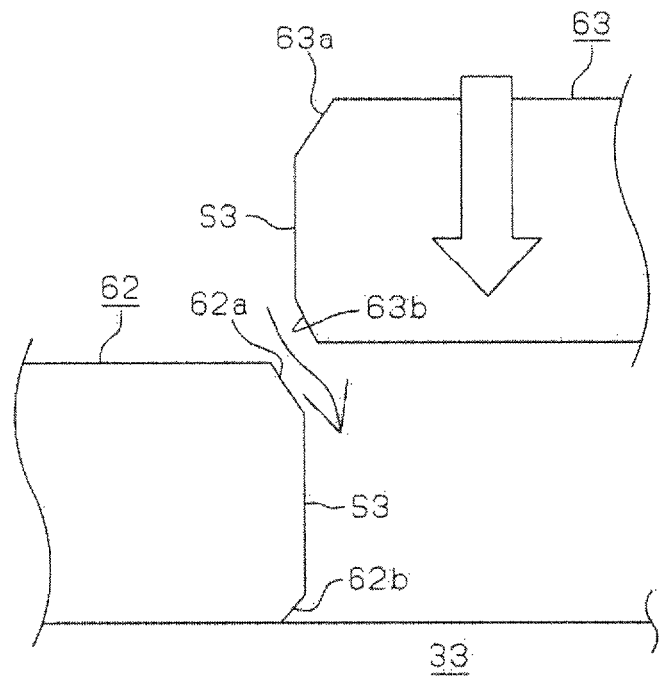
FIG. 8A is a view illustrating the operation of inclined faces during assembly of deflector pieces in the second embodiment.

As illustrated in FIG. 8A, first, the first deflector piece 62 is attached to the ball screw nut 33. In this state, the second deflector piece 63 is placed from above, so that the mating faces S3 of the deflector pieces 62, 63 face each other. At this time, the inclined face 63b of the second deflector piece 63 makes contact with the inclined face 62a of the first deflector piece 62. As indicated by an arrow in FIG. 8A, the second deflector piece 63 is guided along the inclined face 62a to a position adjacent to the first deflector piece 62. The same operation as described above is obtained when the first deflector piece 62 is placed after the second deflector piece 63 is attached to the ball screw nut 33.

Figure 8B:
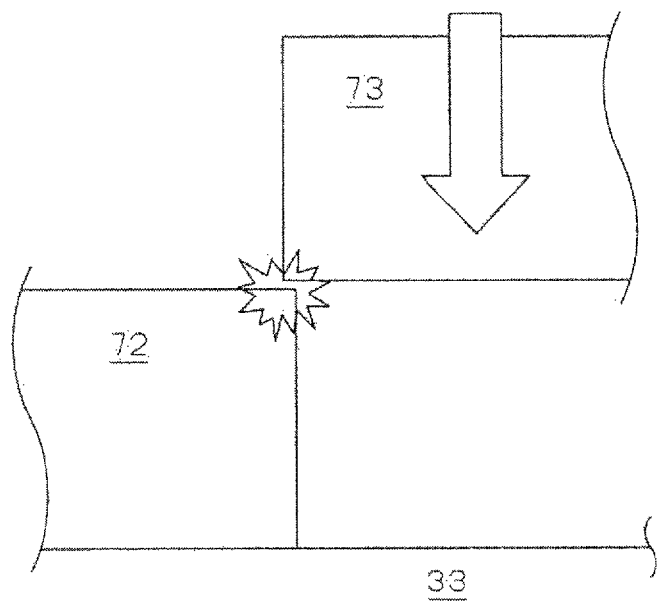
FIG. 8B is a view illustrating the state where corners of deflector pieces without inclined faces contact each other.

On the other hand, as illustrated in a comparative example in FIG. 8B in which corners of deflector pieces 72, 73 are not chamfered, when the deflector piece 73 is placed next to the deflector piece 72, the corners of the deflector pieces 72, 73 contact each other. As a result, smooth placement of the deflector piece 73 may be hindered, and burrs may be formed.

In contrast to this, according to the present embodiment (structure in FIG. 8A), the deflector pieces 62, 63 are smoothly assembled together. Further, formation of burrs is suppressed. The second embodiment produces especially the following effects.

4) The portions of the deflector pieces 62, 63, which will contact each other during assembly of the deflector pieces 62, 63, are chamfered, so that the inclined faces 62a, 62b, 63a, 63b are formed. This allows the deflector pieces 62, 63 to be smoothly assembled together along the inclined faces 62a, 62b, 63a, 63b. Therefore, the time required for the assembly of the deflector pieces 62, 63 is reduced. Further, formation of burrs is suppressed.

5) The inclined faces 62a, 63a are formed at the corners of the deflector pieces 62, 63, which will contact each other during assembly of the deflector pieces 62, 63. In this structure, the area of contact between the deflector pieces 62, 63 is large. Thus, stress concentration that may occur at the time of contact between the deflector pieces 62, 63 is reduced.

The foregoing embodiments may be modified as described below. In the foregoing embodiments, the deflector 41 is formed of two separate pieces having shapes obtained by splitting the deflector 41 into two pieces. Alternatively, the deflector may be formed of three or more separate pieces having shapes obtained by splitting the deflector into three or more pieces. In this case as well, the overall length of each deflector piece is easily measured by forming the end face of each deflector piece along the lead angle A1. Further, the deflector pieces may vary in length.

In the foregoing embodiments, the end faces S1, S2 of the deflector pieces 42, 43 are formed in a planar shape. Alternatively, the end faces may be formed in a curved face shape. In the foregoing embodiments, the invention is applied to the EPS 1 that is a so-called rack coaxial-type EPS. However, the invention may be applied to any other types of electric power steering systems including a deflector, such as a rack parallel-type EPS. In this case, the outer peripheral face of a ball screw nut and the outer peripheral face of the deflector are flush with each other. Thus, a pulley is easily disposed on the outer peripheral faces of the ball screw nut and the deflector.

In the second embodiment, as illustrated in FIG. 8A, the inclined faces 62a, 63a are formed at the corners of the deflector pieces 62, 63, which may contact each other. Alternatively, one of the inclined faces 62a, 63a may be omitted. In this case as well, the deflector pieces 62, 63 are smoothly assembled together along the inclined face 62a, or 63a, which is not omitted.

Chamfering of the corners of the deflector pieces 62, 63, which may contact each other, may be chamfering for forming curved faces, such as rounding. Forming curved faces at the corners allows the deflector pieces 62, 63 to be smoothly assembled together.

What is claimed is:

1. A ball screw deflector comprising:
a plurality of deflector pieces; wherein:
the deflector is elongated to form a circulation path along a length of the deflector that circulates balls that roll between a ball screw portion formed on an outer periphery of a linear-motion shaft and a ball screw nut disposed around the ball screw portion, the circulation path being substantially parallel to an axial direction of the linear-motion shaft along the length of the deflector;
the deflector is disposed at an outer peripheral face side of the ball screw nut;

the deflector is formed by assembling together the deflector pieces having shapes obtained by splitting the deflector transverse to the circulation path along the length of the deflector at intermediate positions of the deflector in an axial direction of the linear-motion shaft; and a mating face of each of the deflector pieces and an end face of each of the deflector pieces, the end face being located on an opposite side of the deflector piece from the mating face, are parallel to each other and have an angle corresponding to a lead angle of the ball screw portion.

2. The ball screw deflector according to claim 1, wherein the end face of each of the deflector pieces is formed in a planar shape.

3. The ball screw deflector according to claim 1, wherein:
the deflector pieces are assembled together from a radial direction of the linear-motion shaft such that the deflector pieces are connected to each other at the mating faces; and at least one of corners of the mating faces of the deflector pieces, the corners contacting each other during assembly of the deflector pieces, is chamfered so as to be formed in an inclined face or a curved face.

4. The ball screw deflector according to claim 2, wherein:
the deflector pieces are assembled together from a radial direction of the linear-motion shaft such that the deflector pieces are connected to each other at the mating faces; and at least one of corners of the mating faces of the deflector pieces, the corners contacting each other during assembly of the deflector pieces, is chamfered so as to be formed in an inclined face or a curved face.

5. The ball screw deflector according to claim 1, wherein an outer peripheral face of each of the deflector pieces and the outer peripheral face of the ball screw nut are formed so as to be flush with each other when the deflector pieces are fitted to the ball screw nut.

6. The ball screw deflector according to claim 2, wherein an outer peripheral face of each of the deflector pieces and the outer peripheral face of the ball screw nut are formed so as to be flush with each other when the deflector pieces are fitted to the ball screw nut.

7. The ball screw deflector according to claim 3, wherein an outer peripheral face of each of the deflector pieces and the outer peripheral face of the ball screw nut are formed so as to be flush with each other when the deflector pieces are fitted to the ball screw nut.

8. The ball screw deflector according to claim 4, wherein an outer peripheral face of each of the deflector pieces and the outer peripheral face of the ball screw nut are formed so as to be flush with each other when the deflector pieces are fitted to the ball screw nut.

9. The ball screw deflector according to claim 1, wherein the number of the deflector pieces is two.

10. The ball screw deflector according to claim 9, wherein the two deflector pieces have the same shape.

11. The ball screw deflector according to claim 10, wherein an upper corner and a lower corner of the mating face of each of the deflector pieces are chamfered so as to be formed in inclined faces or curved faces.

12. The ball screw deflector according to claim 1, wherein each of the deflector pieces is produced by metal injection molding in which a mixture of metal powder and a binder is injected into a molding die.

* * * * *